(12) United States Patent
Shibata et al.

(10) Patent No.: US 8,459,857 B2
(45) Date of Patent: Jun. 11, 2013

(54) PLANAR LIGHT SOURCE DEVICE AND DISPLAY APPARATUS USING THE SAME

(75) Inventors: Koichi Shibata, Tokyo (JP); Takuya Sakamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 274 days.

(21) Appl. No.: 13/069,984

(22) Filed: Mar. 23, 2011

(65) Prior Publication Data

US 2011/0261585 A1    Oct. 27, 2011

(30) Foreign Application Priority Data

Apr. 26, 2010  (JP) .................................. 2010-101003

(51) Int. Cl.
*F21V 7/04* (2006.01)
(52) U.S. Cl.
USPC ............ 362/613; 362/612; 362/633; 362/607
(58) Field of Classification Search
USPC ......................................... 362/612, 613, 633
See application file for complete search history.

(56) References Cited

U.S. PATENT DOCUMENTS

| | | | | |
|---|---|---|---|---|
| 8,147,113 B2* | 4/2012 | Hamada | ......................... | 362/631 |
| 8,154,702 B2* | 4/2012 | Kim | .............................. | 349/150 |
| 2007/0147074 A1* | 6/2007 | Sakai et al. | .................... | 362/608 |
| 2012/0195071 A1* | 8/2012 | Nishioka et al. | .............. | 362/613 |

FOREIGN PATENT DOCUMENTS

| JP | 2003-242817 | 8/2003 |
|---|---|---|
| JP | 2007-87618 | 4/2007 |

* cited by examiner

*Primary Examiner* — Evan Dzierzynski
(74) *Attorney, Agent, or Firm* — Oblon, Spivak, McClelland, Maier & Neustadt, L.L.P.

(57) ABSTRACT

A planar light source device comprising: a plurality of point light; a light guide plate including an incident surface, wherein the light spread out into a planar shape and the light guide plate emits the light from an emitting surface; and a frame including an opening, wherein the frame has a protrusion that is provided on a light source side of a peripheral end portion of the emitting surface of the light guide plate, wherein the point light sources are arranged at the light source side, wherein the protrusion has difference widths parallel to the emitting surface, and wherein a width of a portion of the protrusion, which corresponds to the position where the point of the point light source is arranged, is wider than a width of a portion of the protrusion, which corresponds to a position between the point light sources.

9 Claims, 5 Drawing Sheets

PLANAR LIGHT SOURCE DEVICE AND DISPLAY APPARATUS USING THE SAME

This application claims priority from Japanese Patent Application No. 2010-101003 filed on Apr. 26, 2010, the entire subject matter of which is incorporated herein by reference.

BACKGROUND

1. Technical Field

The present invention relates to a planar light source device that emits light from a backside of a display device and a display apparatus using the same.

In a related planar light source device that emits the light from a backside of a display device, a sidelight type emits light, which is emitted from point light sources arranged at a side of a light guide plate, from an emitting surface of the light guide plate as planar light.

2. Background

In a planar light source device of JP-A-2007-087618, when point light sources such as LEDs are arranged at a side of a light guide plate, leak light leaked between the light guide plate and a frame is absorbed by a first light shielding area, which is provided at an outer peripheral portion of a light diffusion member or light shielding frame. As a result, the leak light, which cannot be served as illumination light, is prevented from being leaked to a liquid crystal display panel. Further, a difference of brightness, which is caused at an end portion of the planar light source device, is prevented by a second light shielding area, which is provided in correspondence to the LEDs. Thus, uniform illumination light is emitted.

In a backlight device of JP-A-2003-242817, a reflection absorption sheet, which includes light absorption part formed at position corresponding to point light sources such as LEDs and a light reflecting part formed at a position between the two light absorption part, is arranged adjacent to the point light sources, so that non-uniformity of luminance is prevented and the uniformed planar light is emitted from a surface of a light guide plate.

SUMMARY

However, in the related planar light source device, the light absorption members are arranged in an area, which causes the leak light, or at the position corresponding to the point light sources. As a result, the light usage efficiency is lowered.

The present invention is made in consideration of the above problem. An object of the present invention is to provide a planar light source device that prevents a difference of brightness caused at an end portion of a planar light source device and also has high light usage efficiency, in the planar light source device using point light sources.

A planar light source device of the present invention including: a plurality of point light sources arranged on a substantially straight line; a light guide plate, wherein light emitted from the point light sources enters into the light guide plate from an incident surface, and wherein the light spread out into a planar shape and the light guide plate emits the light from an emitting surface; and a frame, which holds the point light sources and the light guide plate, and which includes an opening, wherein the frame has a protrusion that is provided on a light source side of a peripheral end portion of the emitting surface of the light guide plate, wherein the point light sources are arranged at the light source side, wherein the protrusion has difference widths parallel to the emitting surface, and wherein a width of a portion of the protrusion, which corresponds to the position where the point of the point light source is arranged, is wider than a width of a portion of the protrusion, which corresponds to a position between the point light sources.

According to the present invention, it is possible to provide a planar light source device that prevents a difference of brightness caused at an end portion of the planar light source device to prevent non-uniformity of luminance and has also high light usage efficiency.

DESCRIPTION OF PREFERRED ILLUSTRATIVE ASPECTS

First Illustrative Aspect

Figure 1:
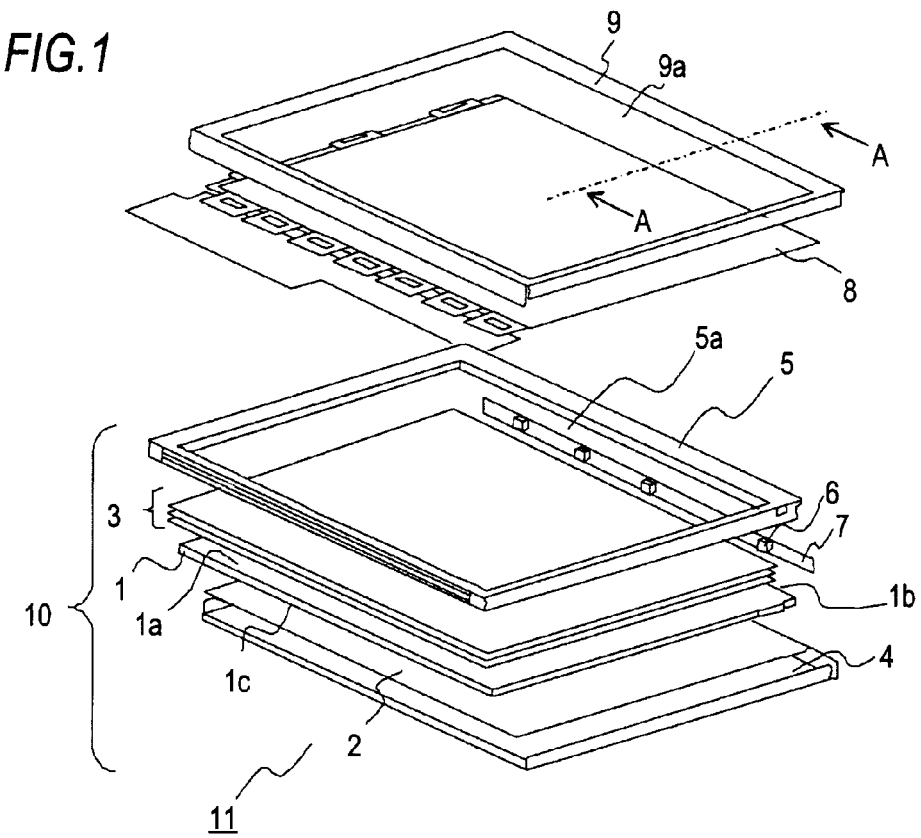
FIG. 1 is an exploded perspective view of a display apparatus according to an illustrative aspect of the invention.
Figure 2:
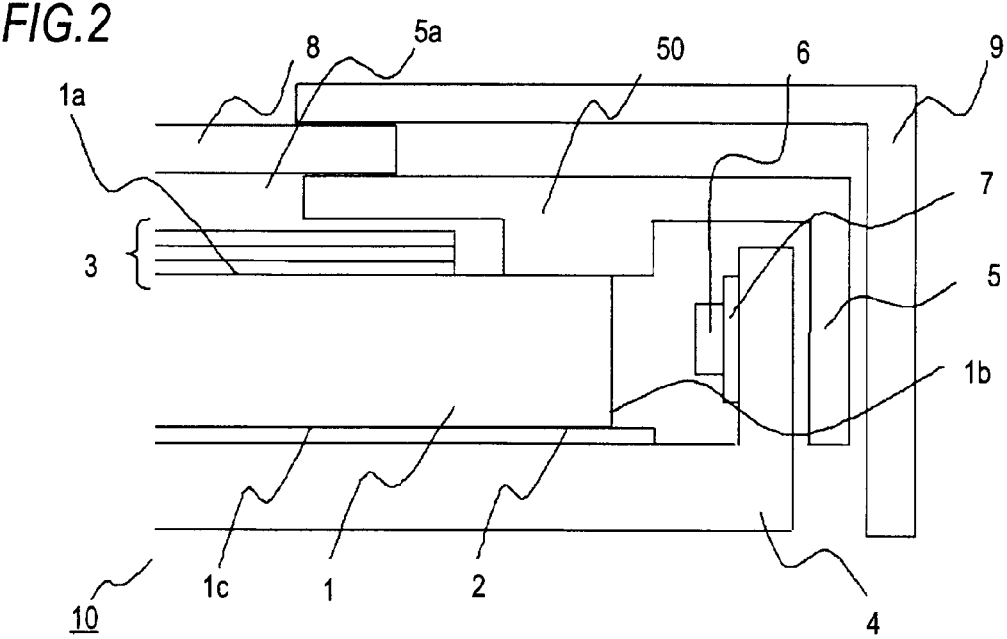
FIG. 2 is a sectional view taken along a line A-A of the assembled display apparatus of FIG. 1.

FIG. 1 is an exploded perspective view showing a schematic configuration of an example of a display apparatus according to the invention, and FIG. 2 is a sectional view taken along a line A-A of the assembled display apparatus of FIG. 1. The display apparatus of the invention includes a display device and a planar light source device that emits uniform light over an entire display area of the display device. The planar light source device is a sidelight type planar light source device including a light guide plate 1 having an incident surface 1b, from which light emitted from two or more point light sources 6 linearly arranged is entered, and an emitting surface 1a from which the light is emitted. The light emitted from the point light sources 6 is spread out into the light guide plate 1, and then the light emitted from the emitting surface 1a. In the meantime, a reflective sheet 2 that reflects the light from the light guide plate 1 is provided at an opposite emitting surface 1c, which is an opposite surface to the emitting surface 1a of the light guide plate 1. Thus, the light emitted from the light guide plate 1 to the opposite emitting surface 1c is reflected and is again directed toward the light guide plate 1. In addition, optical sheets 3 that diffuse and concentrate the light are arranged on the emitting surface 1a of the light guide plate 1. A rear frame 4 that holds the above members and a front frame 5 having an opening 5a configure a planar light source device 10. A display device 8, such as liquid crystal panel, for displaying a variety of information is arranged at a side of the emitting surface of the planar light source device 10. The display device 8 may be a display plate such as signboard, other than the liquid crystal panel. The display device 8 is mounted, and a front face frame 9 having an opening 9a and the planar light source device 10 are engaged, so that a display apparatus 11 is configured.

The light guide plate 1 is a flat plate shape that has light transparency. The light guide plate 1 has a function to emit the light, which is emitted from the point light sources 6 arranged at the incident surface 1b, from the emitting surface 1a. Specifically, the light guide plate is made of a transparent member such as acryl resin, polycarbonate and glass. The opposite emitting surface 1c of the light guide plate 1 is formed with a diffusion pattern, which serves as light diffusion means for diffusing the light and spread out the light in the light guide plate 1. The diffusion pattern is formed by a printed fine shape or fine pattern, such as recess portions of linear notches or dots, formed on the surface of the light guide plate 1, for example. The diffusion pattern diffusely reflects the light propagating in the light guide plate 1 (not shown).

In the light guide plate 1, the light entered from the incident surface 1b is spread in the light guide plate 1 and then the light is emitted from the emitting surface 1a. In other words, the light diffused by the diffusion pattern is emitted as diffusion light, from the emitting surface 1a. By adjusting the diffusion pattern, it is possible to uniformize the emitting light in a direction perpendicular to the arrangement direction of the respective point light sources 6.

The optical sheet 3 is configured by a variety of sheet members, for example a diffusion sheet having diffusivity that is acquired by applying particles on a resin material having light transparency or by forming a micro asperity on a surface thereof and a lens sheet having a prism row. A plurality of pieces or a variety of sheet members is used, as required. By arranging the optical sheets 3 on the emitting surface 1a of the light guide plate 1, it is possible to make the light, which is emitted from the light guide plate 1, have uniform luminance and chromaticity in the opening 5a of the front frame 5 or it is possible to acquire a desired luminance distribution.

As the point light source 6, a Light Emitting Diode (hereinafter referred to as LED) is used. The LED that emits monochromatic light of red (R), green (G), blue (B) and the like or white light is used. When a plurality of LEDs emitting monochromatic light of different colors is used, a color tone can be adjusted by controlling the respective LEDs independently. At least two point light sources 2 are used and are linearly arranged at an equal distance on a light source substrate 7.

A rear frame 4 is a backside housing that accommodates the light guide plate 1, the reflective sheet 2, the optical sheets 3, the point light sources 6, the light source substrate 7 and the like. The rear frame 4 is made of metal such as aluminum, with considering the required strength and the processability. Specifically, since aluminum has high thermal conductivity, it can radiate heat generated from the point light sources 6 and the like.

The front frame 5 is a frame that is engaged with the rear frame 4 to hold the respective members configuring the planar light source device 10. The front frame 5 has the opening 5a corresponding to the emitting area of the light emitted from the light guide plate 1. The front frame 5 is configured by a member made of, for example, resin. The front frame 5 improves light usage efficiency by using a white resin material having reflectivity higher than a black color, rather than a black light absorptive resin. In the meantime, in order to suppress thermal contraction due to change of environmental temperatures, glass having light transmission may be included in the front frame.

Next, protrusion 50 that is formed at the front frame 5 configuring the planar light source device 10 will be described. As shown in FIG. 2, the front frame 5 has the protrusion 50 that is convex toward the emitting surface 1a and is opposed to the emitting surface 1a. The protrusion 50 is provided on a light source side of a peripheral end portion of the emitting surface la of the light guide plate 1, and the point light sources 6 are arranged at the light source side.

Figure 3:
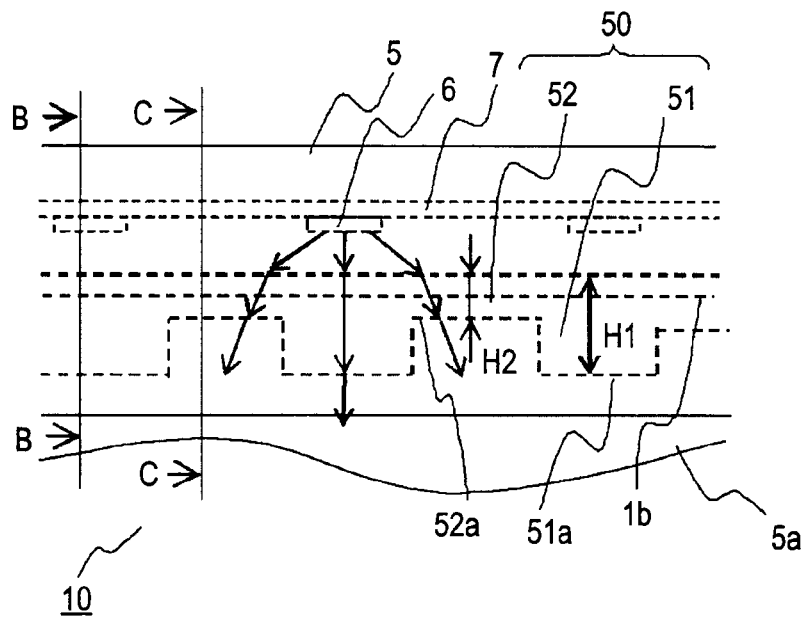
FIG. 3 is a top view of a planar light source device according to an illustrative aspect.

FIG. 3 is a top view of the planar light source device 10 at the light source side of the peripheral end portion, at which the point light sources 6 are arranged. As shown in FIGS. 2 and 3, the protrusion 50, which is formed at a side of the emitting surface 1a in the front frame 5, extends parallel to the emitting surface 1a of the light guide plate 1 and extends from the light source side toward the opening 5a of the front frame 5. Widths of protrusions 50 in the direction parallel to the emitting surface are varied depending on positions where the point light sources 6 are arranged. A protrusion portion 51 formed at a position, which corresponds to a position where the point light source 6 is provided, has a protrusion width H1, a protrusion portion 52 formed at a position, which corresponds to a position where the point light source 6 is not formed (a portion between the point light sources 6), has a protrusion width H2. The protrusion 50 has a shape having alternating convex-concave portion, and the protrusion width H1 is wider than the protrusion width H2.

Figure 4:
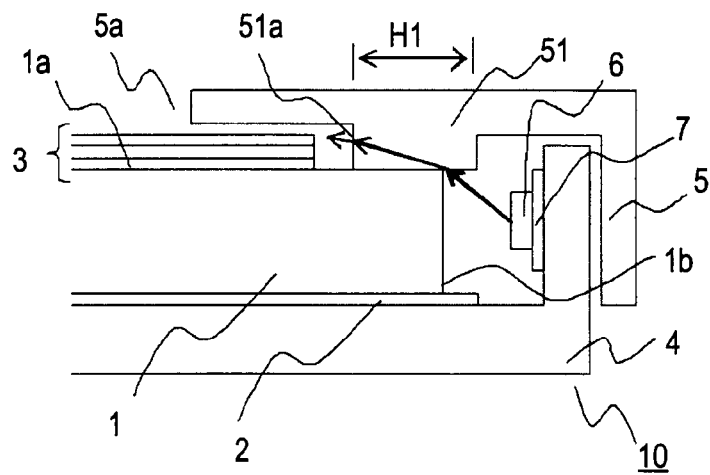
FIG. 4 is a sectional view of a planar light source device according to an illustrative aspect.
Figure 5:
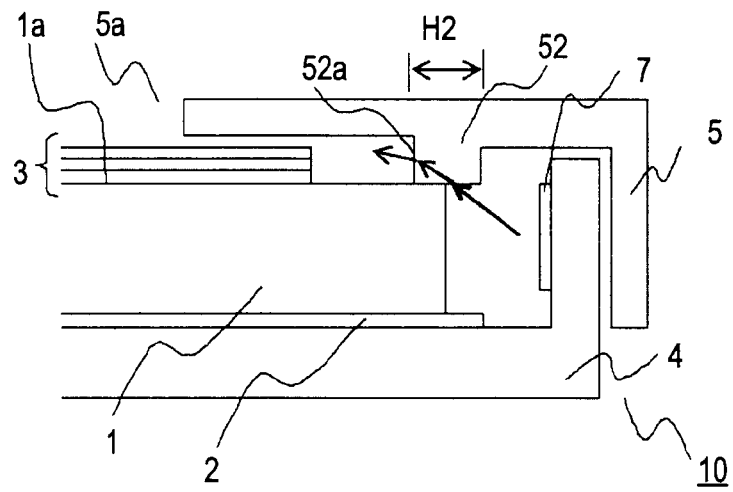
FIG. 5 is a sectional view of a planar light source device according to an illustrative aspect.

Next, operations of the planar light source device 10 of this illustrative aspect will be described. FIG. 4 is a sectional view taken along a line B-B of FIG. 3, and FIG. 5 is a sectional view taken along a line C-C of FIG. 3. Arrows in FIGS. 3 and 4, and so on, indicate trajectories of the emitted light for purposes of illustration, but it may be not exact. Among the light emitted from the point light sources 6 as shown in FIGS. 3 to 5, the light entered from the protrusion 51, which is formed at the position corresponding to the position where the point light source 6s is arranged and has the wide protrusion width H1, is partially absorbed in the front frame 5 and is emitted from an end face 51a that is opposite to the point light source 6. In a similar way, among the light emitted from the point light sources 6, the light entered from the protrusion 52, which is formed at a position between the point light sources 6 and has the narrow protrusion width H2, is partially absorbed in the front frame 5 and is emitted from an end face 52a that is opposite to the point light source 6. At this time, regarding the light absorbed in the front frame 5, since there is a difference between the protrusion width H1 of the protrusion portion 51 and the protrusion width H2 of the protrusion portion 52, light absorption in the protrusion portion 51 is more than light absorption in the protrusion portion 52. Thus, the transmitted-light emitted from the respective end faces 51a, 52a is adjusted to have a uniform luminance distribution.

As described above, the protrusion portions 51, 52 having different protrusion widths H1, H2 are formed at the front frame 5 depending on the arranged positions of the point light sources 6, so that it is possible to uniformize the luminance distribution of the light emitted from the end face of the protrusion 50 formed at the light source side. Thus, the light emitted from the point light sources 6 passes through the protrusion 50 serves to prevent the difference of the brightness caused at the end portion of the planar light source device 10 and serves to prevent the non-uniformity of luminance from being caused in the planar light source device 10. In addition, since it is possible to use the uniformed transmitted light as a part of the light of the planar light source device, it is possible to achieve a planar light source device having high light usage efficiency.

In the meantime, in the above description, the protrusion 50 includes the protrusion portions 51 and 52, which are formed at the front frame 5 and have respectively different protrusion widths H1 and H2. The protrusion portions 51, which are corresponding to the arranged positions of each point light sources 6, are continuously formed with the protrusion portions 52, which are corresponding to a position between the point light sources 6. However, the protrusion portions 51 may be not continuously formed with the protrusion portions 52. In other word, the width H2 of the protrusion portion 52 may be equal to zero (not shown), and the protrusion 50 may includes only the protrusion portions 51 corresponding to the arranged positions of each point light sources 6. Thus, the light emitted from a position between the protrusion portions 51 serves to prevent being dark at between the point light sources 6 and serves to prevent the non-uniformity of luminance from being caused in the planar light source device 10.

Figure 6:
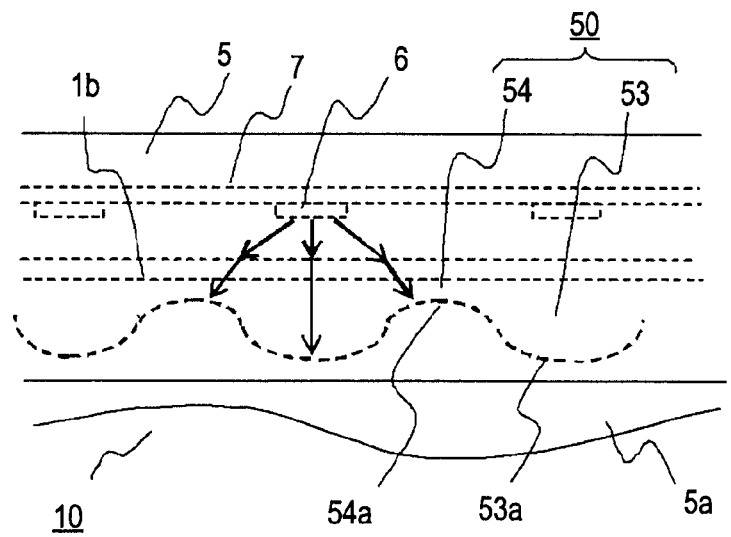
FIG. 6 is a top view of a planar light source device according to an illustrative aspect.

FIG. 6 is a top view of the planar light source 10 that is a modified illustrative aspect. In the planar light source device 10 of FIG. 3, the front frame 5 has the convex-concave shape in which the protrusion portions 51, 52 have the wide protrusion width H1 in a position, which corresponds to the point light source 6, or the narrow protrusion width H1 in a position, which corresponding a position where the point light source 6 is not arranged, and the protrusion portions 51, 52 is the square shape. However, as shown in FIG. 6, the protrusion 50 may form a wavelike shape in which large and small circular arcs are continuously formed. A protrusion portion 53 at a position corresponding to the point light source 6 has a circular arc-shaped side end face 53a that convex toward the opening 5a of the front frame 5 to match a light distribution characteristic of the light emitted from the point light source 6. In addition, a protrusion portion 54 formed at a position, at which the point light source 6 is not arranged (a position between the point light sources 6), has a circular arc-shaped end face 54a that concaves toward the opening 5a of the front frame 5. Accordingly, the protrusion 50 is formed into the wavelike shape having the continuous circular arc-shaped side end faces 53a, 54a to match the light distribution characteristic of the point light sources 6. As a result, it is possible to adjust the light emitted from the respective circular arc-shaped side end faces 53a, 54a, so that the luminance distribution thereof is more uniformed. Therefore, it is possible to suppress further the non-uniformity of luminance.

In the meantime, the illustrative aspects have been described in which the protrusion 50 of the front frame 5 is formed on the light source side of the peripheral end portion of the emitting surface 1a, at which the point light sources 6 are arranged. However, the protrusion may be also formed appropriately on a side of the peripheral end portion of the emitting surface 1a of the light guide plate 1, at which the point light sources 6 are not arranged.

Second Illustrative Aspect

Figure 7:
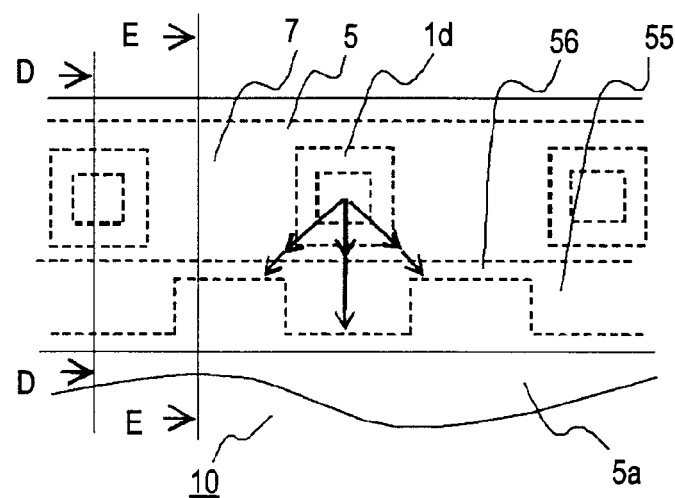
FIG. 7 is a top view of a planar light source device according to an illustrative aspect.
Figure 8:
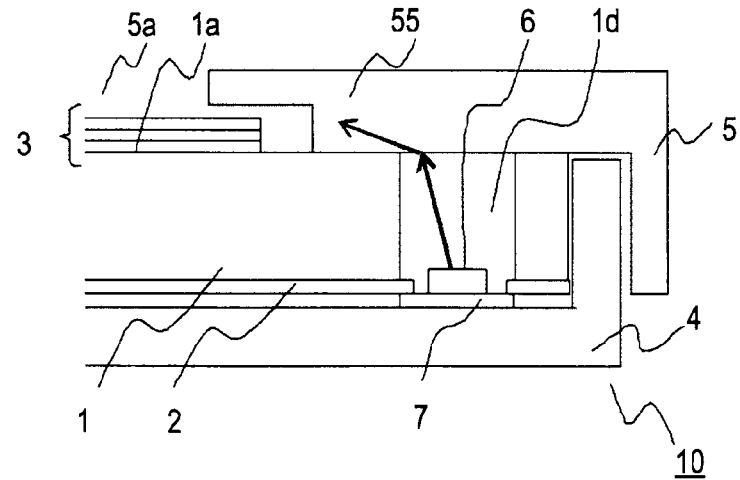
FIG. 8 is a sectional view of a planar light source device according to an illustrative aspect.
Figure 9:
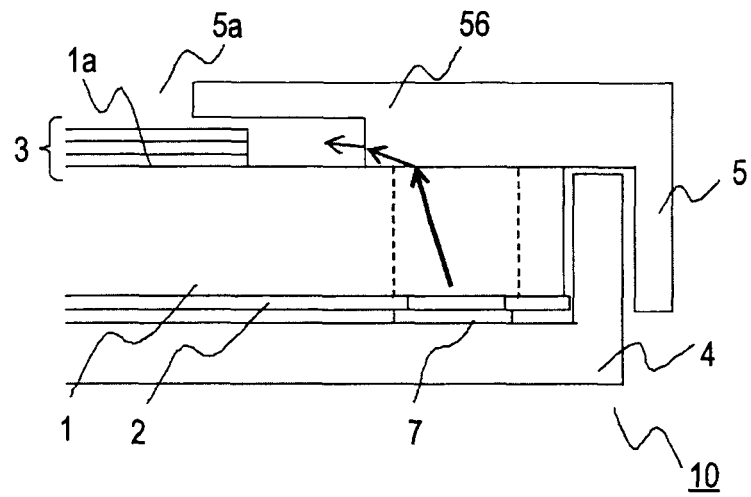
FIG. 9 is a sectional view of a planar light source device according to an illustrative aspect.

FIG. 7 is a top view of the planar light source device 10 according to a second illustrative aspect, FIG. 8 is a sectional view taken along a line D-D of FIG. 7 and FIG. 9 is a sectional view taken along a line E-E of FIG. 7. In the first illustrative aspect, the point light sources 6 are arranged at one side surface of the rear frame 4. In the second illustrative aspect as shown in FIGS. 7 to 9, the point light sources 6 are arranged on a bottom surface of the rear frame 4, which is positioned at a backside of the display device, and holes 1d are formed at positions corresponding to the point light sources 6 of the light guide plate 1. Except for this configuration, the second illustrative aspect is the same as the first illustrative aspect. In addition, the second illustrative aspect achieves the same effects as those of the first illustrative aspect, except for specific effects of the second illustrative aspect, which will be described below.

As shown in FIGS. 7 to 9, the point light sources 6 are arranged on the bottom surface of the rear frame 4 and the holes 1d are formed at the light guide plate 1 of the positions corresponding to the point light sources 6. A protrusion portion 55 of the front frame 5, which is formed at a position that corresponds to a position where the point light source 6 is arranged, has a wide protrusion width that is parallel to the emitting surface 1a of the light guide plate 1 and extends from the light source side toward the opening 5a of the front frame 5, and a protrusion portion 56, which is formed at a position at which the point light source 6 is not formed (a position between the point light sources 6), has a narrow protrusion width, so that the convex-concave shape is formed.

In the planar light source device according to the second illustrative aspect, the protrusion portions 55, 56 have different protrusion widths depending on the positions of the point light sources 6. The point light sources 6 are arranged on the bottom surface of the rear frame 4 and the holes 1d are formed at the positions corresponding to the point light sources 6 of the light guide plate 1. According to this configuration, among the light emitted from the point light sources 6, the light entered from the protrusion portion 55, which is formed at the position corresponding to the position of the point light source 6 and has the wide protrusion width, is partially absorbed in the front frame 5 and is emitted from an end face of the protrusion that is opposite to the point light source 6. Among the light emitted from the point light sources 6, the light entered from the protrusion portion 56, which is formed at a position between the point light sources 6 and has the narrow protrusion width, is partially absorbed in the front frame 5 and is emitted from an end face of the protrusion that is opposite to the point light source 6. Regarding the light absorbed in the front frame 5, since there is a difference between the protrusion width of the protrusion portion 55 and the protrusion width of the protrusion portion 56, light absorption in the protrusion portion 55 is more than light absorption in the protrusion portion 56. Thus, the transmitted-light emitted from the respective end faces is adjusted to have a uniform luminance distribution.

Third Illustrative Aspect

Figure 10:
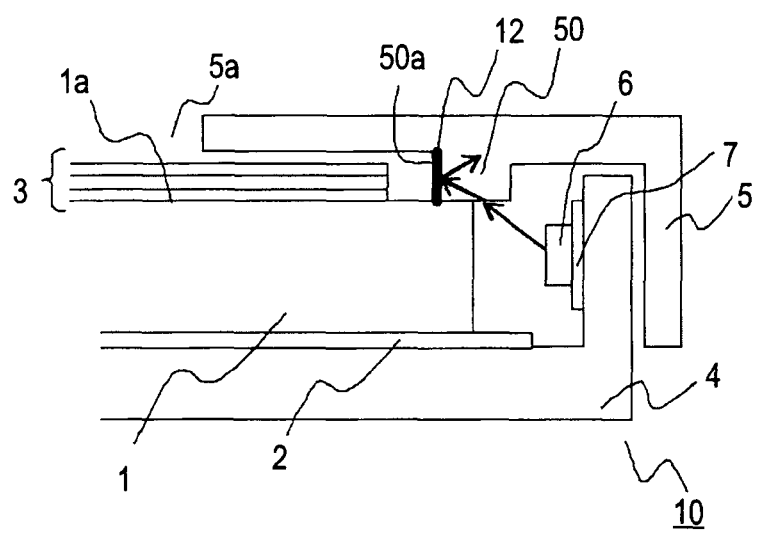
FIG. 10 is a sectional view of a planar light source device according to an illustrative aspect.

FIG. 10 is a sectional view of a planar light source device according to a third illustrative aspect. In the first and second illustrative aspects, the protrusion 50 having different protrusion widths are provided on the front frame 5 opposing to the emitting surface 1a of the light guide plate 1, so that the light emitted from the end faces of the protrusion 50 is uniformed. In the third illustrative aspect as shown in FIG. 10, reflecting members 12 are arranged on the end faces without forming the protrusion portions and changing the protrusion widths of the protrusion 50 provided to the front frame 5.

In the planar light source device 10 as shown in FIG. 10, among the light emitted from the point light sources 6, the light, which is entered from the protrusion 50 of the front frame 5 and is transmitted in the protrusion 50, directs to end faces 50a of the protrusion 50 provided at the opening 5a. Then, the transmitted light is reflected by the reflecting members 12 arranged on the end faces 50a. Accordingly, it is possible to suppress the light that is transmitted the front frame 5 and is emitted from the front frame 5.

As described above, according to the third illustrative aspect, the reflecting members 12 are provided on the end faces 50a of the protrusion 50, which is provided at a side of the opening 5a of the front frame 5. Hence, it is possible to suppress the light, which is transmitted the front frame 5 and is emitted from the front frame 5, and to prevent securely the difference of brightness, which is caused at the end portion of the planar light source device. As a result, the non-uniformity of luminance occurring in the planar light source device is prevented.

Figure 11:
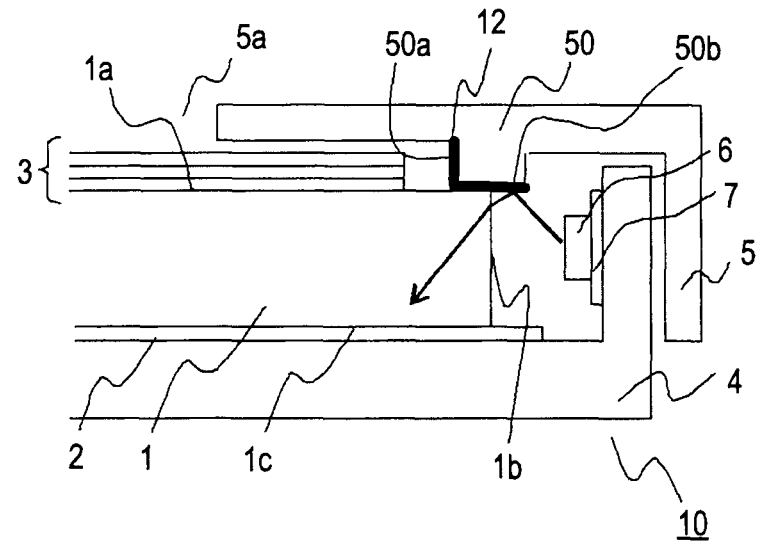
FIG. 11 is a sectional view of a planar light source device according to an illustrative aspect.

FIG. 11 is a sectional view of a modified third illustrative aspect. In the configuration of the planar light source device 10 shown in FIG. 10, the reflecting members 12 arranged on the end faces 50a of the protrusion 50, which is provided at the side of the opening 5a, reflect the light transmitted in the front frame 5. As a result, the difference of brightness that is caused at the end portion of the planar light source device is prevented. In this modified third aspect as shown in FIG. 11, the reflecting members 12 are also arranged on end faces 50b that are a part of the protrusion 50 of the front frame 5 and are opposite to the emitting surface 1a of the light guide plate 1. By this configuration, it is possible not only to prevent the light, which is transmitted in the front frame 5 and is emitted, by the reflecting members 12 provided on the end faces 50a of the protrusion 50, but also to reuse the light emitted from the point light sources 6 by reflecting the light at the reflecting members 12 arranged on the end faces 50b and causing the reflected light to enter into the light guide plate 1. Further, the light reflected by the reflecting members 12 arranged on the end faces 50b is served as light that is directed from the incident surface 1b of the light guide plate 1 toward the opposite emitting surface 1c of the light guide plate. As a result, the reflected light can be served as light spread and be uniformed in the light guide plate 1. In addition, in case that a reflective material having a diffusion function is used for the reflecting member 12, it is possible to make the distributed light entered into the light guide plate 1, so that it is possible to make more uniform light.

Figure 12:
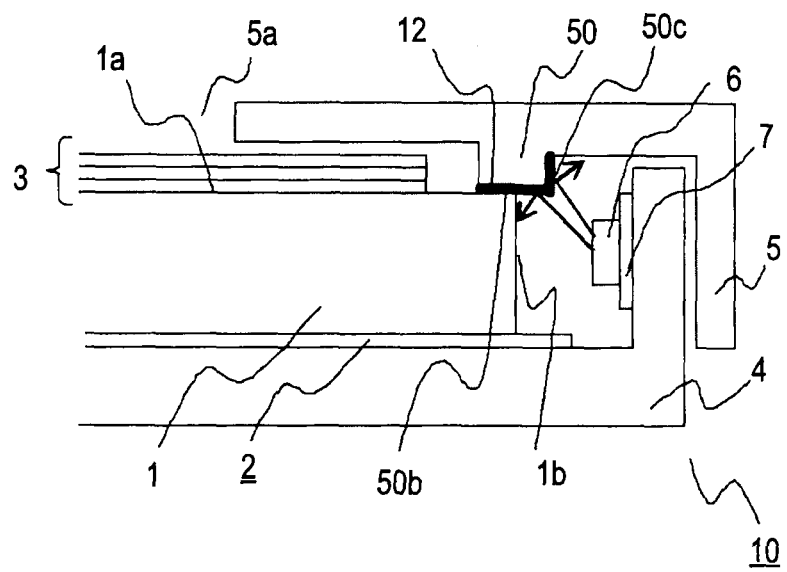
FIG. 12 is a sectional view of a planar light source device according to an illustrative aspect.

FIG. 12 is a sectional view of a modification of this illustrative aspect. As shown in FIG. 12, the reflecting members 12 may be arranged on the end faces 50b at a side of the emitting surface 1a and also arranged end faces 50c, that is a part of the protrusion 50 of the front frame 5 and is adjacent to the positions of the point light sources. Since the end faces 50c faces to the point light sources 6, it is possible to suppress the light entered into the protrusion 50 of the front frame 5. In addition, since the light having reached the end faces 50c can be reflected by the reflecting members 12 and be reused, it is possible to improve the light usage efficiency.

Fourth Illustrative Aspect

Figure 13:
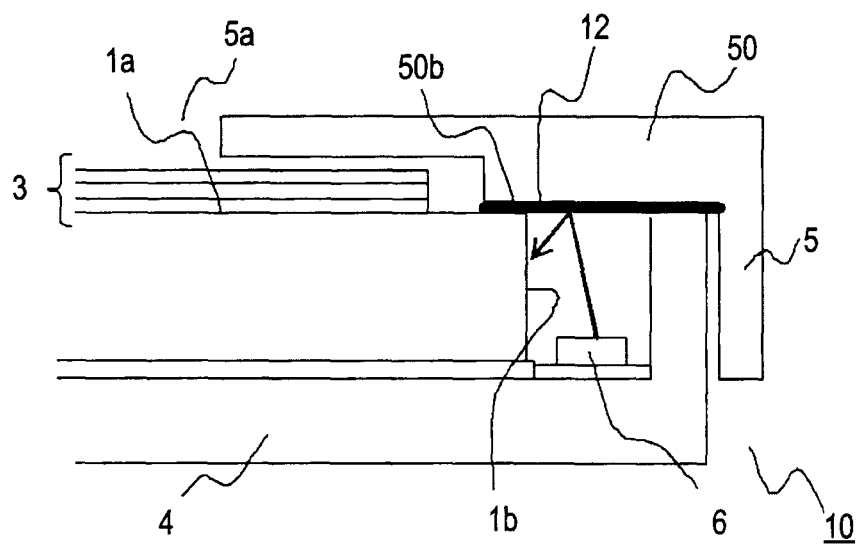
FIG. 13 is a sectional view of a planar light source device according to an illustrative aspect.

FIG. 13 is a sectional view of a planar light source device according to a fourth illustrative aspect. In the third illustrative aspect, the point light sources 6 are arranged at a side surface of the rear frame 4. However, in the fourth illustrative aspect as shown in FIG. 13, the point light sources 6 are arranged on the bottom surface of the rear frame 4 and the reflecting members 12 are arranged on the end faces 50b, which are formed at positions opposed to the point light sources 6 and are a part of the protrusion 50. In the meantime, except for this configuration, the fourth illustrative aspect is the same as the third illustrative aspect. In addition, except for specific effects of the fourth illustrative aspect, which will be described below, the fourth illustrative aspect achieves the same effects as those of the third illustrative aspect.

As shown in FIG. 13, among the light emitted from the point light sources 6, the light toward the front frame 5 is reflected by the reflecting members 12 that are arranged on the end faces 50b of the protrusion 50 opposing to the emitting surface 1a. Among the light reflected from the reflecting members 12, the light entered from the incident surface 1b of the light guide plate 1 can be spread out through the light guide plate 1 and be reused.

As described above, according to the fourth illustrative aspect, the light that is emitted from the point light sources 6 and is directed toward the front frame 5 is reflected at the reflecting members 12 provided on the protrusion 50. As a result, it is possible to prevent the light from being incident into the front frame 5. Accordingly, it is possible to prevent the difference of brightness that is caused at the end portion of the planar light source device.

In addition, the light that is reflected at the reflecting members 12 and is entered from the incident surface 1b of the light guide plate 1 is spread out through the light guide plate 1 and can be reused. Thus, it is possible to improve the light usage efficiency.

In the meantime, the invention is not limited to the respective illustrative aspects. In other words, the illustrative aspects can be variously changed and combined without departing from the scope of the invention.

What is claimed is:

1. A planar light source device comprising:
   a plurality of point light sources arranged on a substantially straight line;
   a light guide plate, wherein light emitted from the point light sources enters into the light guide plate from an incident surface, and wherein the light spread out into a planar shape and the light guide plate emits the light from an emitting surface; and
   a frame, which holds the point light sources and the light guide plate, and which includes an opening,
   wherein the frame has a protrusion that is provided on a light source side of a peripheral end portion of the emitting surface of the light guide plate, wherein the point light sources are arranged at the light source side,
   wherein the protrusion has difference widths parallel to the emitting surface, and wherein a width of a portion of the protrusion, which corresponds to the position where the point of the point light source is arranged, is wider than a width of a portion of the protrusion, which corresponds to a position between the point light sources.

2. The planar light source device according to claim 1, wherein the protrusion has a shape having an alternating convex-concave portion, wherein the convex-concave portions have the difference widths.

3. The planar light source device according to claim 1, wherein the width of the portion of the protrusion, which corresponds to a position between the point light sources, is equal to zero.

4. The planar light source device according to claim 1, wherein the protrusion has:
   a circular arc-shaped side end face, which corresponds to the position where the point light sources is arranged, being convex toward the opening; and
   a circular arc-shaped side end face, which corresponds to the interval of the point light sources, being concave toward the opening,
   wherein the respective circular arc-shaped side end faces form a continuous wavelike shape.

5. A planar light source device comprising:
   a plurality of point light sources arranged on a substantially straight line;
   a light guide plate, wherein light emitted from the point light sources enters into the light guide plate from an incident surface, and wherein the light spread out into a planar shape and the light guide plate emits the light from an emitting surface; and a frame, which holds the point light sources and the light guide plate, and which includes an opening,
wherein the frame has a protrusion that is provided on a light source side of a peripheral end portion of the emitting surface of the light guide plate, wherein the point light sources are arranged at the light source side,
wherein the protrusion is disposed opposite to the emitting surface and is convex toward the emitting surface, and
wherein a reflecting members is arranged on the protrusion.

6. The planar light source device according to claim 5,
wherein the reflecting members are arranged on end face, which is a side face close to the opening, of the protrusion.

7. The planar light source device according to claim 5,
wherein the reflecting members are arranged on an end face, which is opposite to the emitting surface, of the protrusion.

8. The planar light source device according to claim 5,
wherein the reflecting member is arranged on an end face, which is provided adjacent to the arranged position of the point light sources, of the protrusion.

9. A display apparatus comprising:
a planar light source device comprising:
a plurality of point light sources arranged on a substantially straight line;
a light guide plate, wherein light emitted from the point light sources enters into the light guide plate from an incident surface, and wherein the light spread out into a planar shape and the light guide plate emits the light from an emitting surface; and
a frame, which holds the point light sources and the light guide plate, and which includes an opening,
wherein the frame has a protrusion that is provided on a light source side of a peripheral end portion of the emitting surface of the light guide plate, wherein the point light sources are arranged at the light source side,
wherein the protrusion has difference widths parallel to the emitting surface, and
wherein a width of a portion of the protrusion, which corresponds to the position where the point of the point light source is arranged, is wider than a width of a portion of the protrusion, which corresponds to a position between the point light sources; and
a display device disposed opposite to the planar light source device.

* * * * *